United States Patent [19]

Lamb

[11] Patent Number: 5,257,383
[45] Date of Patent: Oct. 26, 1993

[54] PROGRAMMABLE INTERRUPT PRIORITY ENCODER METHOD AND APPARATUS

[75] Inventor: Joseph M. Lamb, Hopedale, Mass.

[73] Assignee: Stratus Computer, Inc., Marlboro, Mass.

[21] Appl. No.: 743,691

[22] Filed: Aug. 12, 1991

[51] Int. Cl.[5] .................................. G06F 9/46
[52] U.S. Cl. ..................... 395/725; 364/DIG. 11;
364/241.2; 364/241.4; 364/241.5; 364/230.2;
364/DIG. 2; 364/949; 364/941.3; 364/941.6
[58] Field of Search ....................... 395/725, 275

[56] References Cited

U.S. PATENT DOCUMENTS

| | | | |
|---|---|---|---|
| 3,925,766 | 12/1975 | Bardotti et al. | 395/725 |
| 4,296,463 | 10/1981 | Dalboussiere et al. | 395/325 |
| 4,438,489 | 3/1984 | Heinrich et al. | 395/725 |
| 4,486,826 | 12/1984 | Wolff et al. | 395/275 |
| 4,493,036 | 1/1985 | Boudreau et al. | 395/725 |
| 4,644,467 | 2/1987 | McCarthy et al. | 395/725 |
| 4,654,857 | 3/1987 | Samson et al. | 371/68 |
| 4,701,845 | 10/1987 | Andreasen et al. | 395/575 |
| 4,807,117 | 2/1989 | Itoku et al. | 395/725 |
| 4,816,990 | 3/1989 | Williams | 395/650 |
| 4,866,604 | 9/1989 | Reid | 395/325 |
| 4,914,580 | 4/1990 | Jensen et al. | 395/325 |
| 4,918,599 | 4/1990 | Hashimoto et al. | 395/725 |
| 4,920,540 | 4/1990 | Baty | 371/61 |
| 4,926,315 | 5/1990 | Long et al. | 395/575 |
| 4,994,960 | 2/1991 | Tuchler et al. | 395/725 |
| 5,020,024 | 5/1991 | Williams | 395/550 |
| 5,083,258 | 1/1992 | Yamasaki | 395/725 |
| 5,101,497 | 3/1992 | Culley et al. | 395/725 |

FOREIGN PATENT DOCUMENTS 0355856 8/1989 European Pat. Off. .

OTHER PUBLICATIONS

Electronics & Wireless World, vol. 94, No. 1634, Dec. 1988, Surrey GB Clements "Multiprocessor Systems" pp. 1190-1192.
EDN Electrical Design News, vol. 28, No. 26, Dec. 1983, Newton, MA, U.S., pp. 270-272 Klein "FPLA Forms VME Bus Interrupter", p. 272.
Joe Salemi, "Advisor", *PC Magazine*, May 14, 1991, pp. 27-28.
Jeff Prosise, "Tutor", *PC Magazine*, May 14, 1991, pp. 441-442.

*Primary Examiner*—Debra A. Chun
*Attorney, Agent, or Firm*—Lahive & Cockfield

[57] ABSTRACT

A programmable, multi-level interrupt priority encoder which fields interrupts from connected devices, e.g., DMA engine, scanner, and timer, and signals an interrupt value, or priority level, associated with that device. These levels, which may range from zero to seven or more, depending upon the system with which it is applied, are used by the CPU to determine which of the plural interrupting devices to service. Using the encoder of the invention, multiple devices can be set at the same priority level.

8 Claims, 6 Drawing Sheets

PROGRAMMABLE INTERRUPT PRIORITY ENCODER METHOD AND APPARATUS

BACKGROUND OF THE INVENTION

The present invention relates to digital data processing and, more particularly, to apparatus which programmably adjusts the handling and prioritization of multiple device interrupts. The invention has application, for example, as a highly flexible means for coordinating interrupts by low-level devices vying for CPU (Central Processing Unit) time.

Conflicts relating to requests for computer processing time are unavoidable. Even with the great improvements over the past few years in clock speeds and data transfer rates, a computer cannot operate infinitely fast. As such, requests to the CPU, or "interrupt" requests, tend to accumulate. Simultaneous interrupts exemplify the problem, since it is clear that choices must be made between the several requests. The computer should choose, for example, to prevent a system crash before it prints a document. Thus, pending interrupts should generally be prioritized so that the most urgent interrupt request is answered first.

Assigning priorities to device interrupts properly considers the origination of the generated request. Interrupt conflicts can occur at several levels. Most users are familiar with the high-level conflicts associated with the several peripheral devices, such as a printer or secondary disk drive. A plurality of connected peripheral devices queuing for CPU time is typical for the modern computer system. But the occurrences of these device interrupts are relatively infrequent. Printer interrupts, for instance, usually occur after a user prompts the system.

Low-level requests to the CPU, on the other hand, occur almost invisibly to the operator. They are also dynamic and frequent. Timers, scanners, and Direct Memory Access (DMA) engines are examples of internally connected devices which generate interrupt requests to the CPU. The functioning of these devices is much more intimate with the CPU; even their physical locations are much closer.

Therefore, the approach and benefits in assigning priority levels to multiple device interrupts depends to some extent upon the level at which the conflicting devices occur. Adjusting the priority of peripheral device interrupts, for instance, would entail design methodology quite different from the low-level, dynamic device interrupts of DMA engines and timers. It may be sufficient, for example, to hardwire peripheral devices according to their desired relative priority.

In practice, some methods exist to prioritize device interrupts, but they are typically geared towards the high-level request conflicts of the external or peripheral devices, not low-level interrupt conflicts. The schemes commonly involve fixed-level priorities, whereby either the device or data channel is labeled, or rely upon temporal criterion, like the time of occurrence. Moreover, the assignation of relative interrupt priorities is usually cumbersome and restricted to serial, single-level priorities.

For example, U.S. Pat. No. 3,925,766, entitled "Dynamically Variable Priority Access System", describes how interrupt priority assignments can be made for access to data Processing memory. An information exchange control unit is hooked to the CPU and contains a series of flip-flops which gate a priority network for the appropriate peripheral interrupt. The approach re-routes the interrupt signal into a fixed set of transmission lines representing the priority selection matrix. It does not allow for equal or secondary priorities.

Similarly, U.S. Pat. No. 4,644,467, entitled "Multi-Level Dynamic Priority Selector Groups of Data Elements", describes daisy chain interface circuitry specific to an external interrupt generating device which is programmably assigned priority codes through the issuance of predetermined address codes. A code monitor then locates the element with the highest priority. The teaching again does not describe equal or secondary priorities.

These and other teachings are difficult to apply to, or are too inflexible for, low-level device priority manipulation. Nevertheless, a user or system designer would find it extremely beneficial to adjust the priority of the low-level interrupts depending upon the desired process task at hand. For example, a DMA engine is logic, internal to an input/output processor (IOP), that moves large blocks of data directly between system memory and a connected device. Under certain circumstances, this may become a critical function to the user. Hence, that user would Prefer a high priority for the DMA engine at that time. Because the interrupt occurrences are highly frequent, significant amounts of processing time could be allocated to the DMA engine in favor of, for example, the IOP timer. Programmably adjusting the priority of the DMA engine would be beneficial.

To this end, the prioritization schemes developed in the art are inappropriate. Thus, there remains a need for an interrupt priority controller that enables relatively easy interrupt priority alteration of connected low-level devices.

Accordingly, it is an object of the present invention to provide an improved interrupt priority encoder.

It is further the object of this invention to provide an interrupt priority controller which provides for primary and secondary priority designation of connected devices.

Yet another object of this invention is to provide a priority interrupt encoder that allows system users to fine-tune system performance according to desired tasks.

Other objects of the invention are evident in the description that follows.

SUMMARY OF THE INVENTION

The aforementioned objects are attained by the invention which provides in one aspect an improved interrupt priority encoder that is both multi-tiered and programmable. The encoder fields interrupts from connected devices, e.g., DMA engine, scanner, and timer, and develops an interrupt value, or priority level, programmably associated with that device. These levels are used by the CPU to select the interrupt of highest programmed priority amongst the several interrupts accumulated. When the CPU is ready to process the next interrupt request, it generates a query signal, which the interrupt priority encoder matches to specifically identify the appropriate device. The CPU may then service the device. Multiple interrupts of equal priority are selected through the CPU by the fixed second-level priority arrangement in the encoder.

An interrupt priority encoder as described above has application in a digital signal processor of the type having one or more devices that assert an interrupt signal, and a CPU for receiving and processing the interrupt signals. The encoder provides, in one aspect, a plurality of interrupt control block (ICB) elements chained together in a determined order, each ICB element being connected to a interrupt generating device. The ICB elements include a programmable level storage element to store an operator-selectable priority level, or interrupt value, for the device associated with that ICB. Since each ICB is selectively programmable by an operator, the interrupt value associated with each device may be changed without physically decoupling the device from the ICB. When a device asserts an interrupt, each ICB element drives a level interrupt device creating a signal (DVL) representative of its programmably stored interrupt priority value.

For example, in an arrangement utilizing the interrupt priority encoder, a DMA engine, scanner, and timer would each have an associated ICB element. The operator could, if desired, prioritize the DMA engine by Programming the DMA engine ICB with the highest relative priority. For each DMA engine interrupt request, a DVL signal would be generated by the level interrupt encoder containing the highest relative priority. The operator could then optimize the system to respond more quickly to the house-keeping, memory-management functions of the DMA engine, as opposed to, for example, the timer.

Each ICB element also receives and processes a query signal which is generated by the CPU and sent to the ICB elements. To accomplish this function, the ICB first determines if its associated device produced an interrupt. If no interrupt was developed, the ICB passes on the CPU query to the other ICB elements in a CH OUT signal. If an interrupt was developed, the ICB compares the CPU query signal interrupt level to the stored interrupt value of its associated device. If the comparison does not match, the ICB again passes on the CPU query to the other ICB elements in a CH OUT signal. If, however, the comparison matches, the ICB generates a match signal (DEV ACK). The match response signal signifies that a particular device created an interrupt of requisite priority and that the CPU is now ready to process that level interrupt request.

To specifically identify the device associated with the match signal—i.e., the device which asserted an interrupt level which is about to be processed by the CPU—the invention encodes a signal vector representative of that device. The vector encoding circuitry is responsive to a DEV ACK, or match signal. The vector itself is input to a return data path (MUX) to the CPU, enabling the CPU to process the correct device interrupt request.

Thus in the example above, once the DMA engine generates an interrupt request, a DVL signal is immediately manufactured through the associated ICB and level interrupt device, and sent to the CPU. Because the DMA engine was programmed at the highest relative priority, the CPU would process this interrupt signal next. The CPU simply compares accumulated requests, selects the highest priority interrupt value (the DMA engine), and asserts a query signal, or interrupt acknowledge (IACK), along with the interrupt level it has chosen to process. The query signal is passed through successive ICB elements via the CH OUT signal or until the ICB associated with the DMA engine generates a DEV ACK match signal. The DEV ACK signal is in turn transformed into a vector specifically identifying the DMA engine. The vector supplies the information needed by the CPU to process the DMA engine interrupt request next.

In another aspect of the invention, the ICB elements of the interrupt priority encoder are in serial communication with one another, such that ICB elements receive signals from preceding ICB elements. The first ICB receives and processes the IACK query signal directly from the CPU. If there is no match, or if there was no interrupt asserted from the associated device, a CH OUT signal is generated and sent to the next sequential ICB. The CH OUT signal equivalently represents the IACK query signal sent from the CPU, and is processed by the subsequent ICB as such. At any point in the sequence, if there is a match to IACK or to a successive CH OUT signal, no further transmission along the ICB sequence is needed. The matched DEV ACK signal from that ICB is sent to other circuitry of the interrupt priority encoder, where it is encoded as a CPU-bound vector.

In this aspect, devices can be arranged according to a secondary priority, the ICB closest in series to the CPU having highest preference, and the ICB furthest in series from the CPU having the lowest preference. Under this aspect, should two or more devices have equivalent programmed priority—a programmable feature available at the operator's request—the secondary authority provides the encoder's second-tier priority selection.

In another aspect of the invention, the serial arrangement of the ICB elements are chained together, where again the ICB element which is closest in series to the CPU has the highest secondary authority, and where the ICB element furthest in series along the chain has lowest secondary authority.

According to another aspect of the invention, the first ICB element in the serial arrangement or chain configuration is not programmable. The first ICB in this arrangement would preferably have a fixed priority level higher than that of any other ICB element in the series or ring. Such an ICB could effectively handle extremely high priority interrupt events, like system crashes.

These and other aspects of the invention are evident in the drawings and in the description which follows.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE ILLUSTRATED EMBODIMENT

Figure 1:
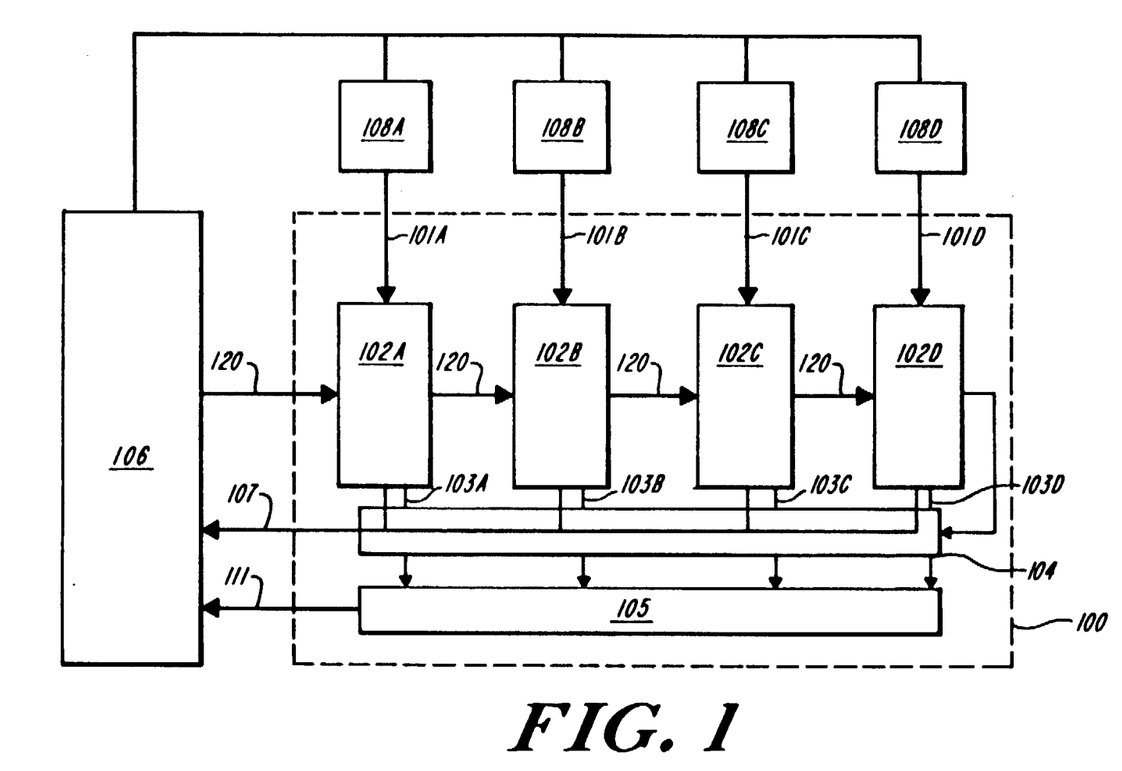
FIG. 1 depicts a priority interrupt encoder system constructed in accordance with the invention.

Briefly, as shown in FIG. 1, an interrupt priority encoder 100 constructed in accordance with the invention includes interrupt control blocks (ICB) 102A-D, each of which is associated with a device 108A-D, such as a DMA engine, scanner, timer, and the like. The encoder 100 also includes a level interrupt encoder 104 and vector encoding circuitry 105.

FIG. 1 also illustrates the functional use of the interrupt priority encoder 100. As indicated, several of the signals generated by the encoder are shown, including: interrupt requests 101 from devices 108, 3-bit level priority signal (DVL) 107 from the level interrupt encoder 104, CPU 106 interrupt acknowledge signal (IACK) 120 which passes through the various ICB elements 102, match signals (CBACK) 103 generated by an ICB 102 with the correct priority level, and the encoder's returned vector (VCT) 111 specifying the interrupting device 108.

In operation, by way of example, when a device 108C signals an interrupt 101C to the CPU 106, that signal is initially received by the ICB 102C associated with that device 108C. ICB 102C then drives the level interrupt encoder 104 to generate a 3-bit number, i.e. the DVL signal, representative of the programmed level characterizing the interrupt priority asserted from its associated device 108C. The programmed level, which is stored within ICB 102C, is programmably assigned for a particular associated device 108C by a remote operator. The levels assigned to the devices 108A-D may be unique or may overlap, depending upon the desired operational characteristics. The assigned priority for ICB 102C is preferably a 3-bit number, with 7 identifying the highest level priority.

The 3-bit interrupt signal 107 generated from the level interrupt encoder 104 is then transmitted to the CPU 106. Upon receipt, CPU 106 enters an interrupt acknowledge cycle to determine which device 108 asserted the interrupt. CPU 106 asserts a query signal 120 (an interrupt acknowledge IACK signal), including the level chosen among accumulated interrupts, and transmits it to the ICB elements 102. The query signal 120 is passed through each ICB element 102 in an ordered manner determined by the sequence of ICBs, e.g., 102A to 102D, until the ICB associated with the interrupt-signalling device 108C acknowledges the query with a "match" signal 103C. At that point, the signal is routed to vector encoding circuitry 105. This vector 111 is sent to CPU 106 and contains the specific information, e.g., a pointer to an address of trap-handling code, needed to correctly process the interrupt request 101C of device 108C.

The encoder 100 enables multiple devices to have the same assigned priority level by including a fixed second-level priority When multiple devices 108A-D have the same programmably assigned priority level and have outstanding interrupts 101A-D to be serviced, then the vector 111 returned during an interrupt acknowledge cycle for that level interrupt would be determined by the fixed second-level priority scheme. The second-level priority is generally associated with the physical location of the device 108 with respect to the ICB element 102 or the CPU 106. The second level priority is enabled by a serial link of the ICB elements 102.

FIGS. 2-7 should be read concurrently with FIG. 1 for more complete operational understanding of the interrupt priority encoder 100.

Figure 2:
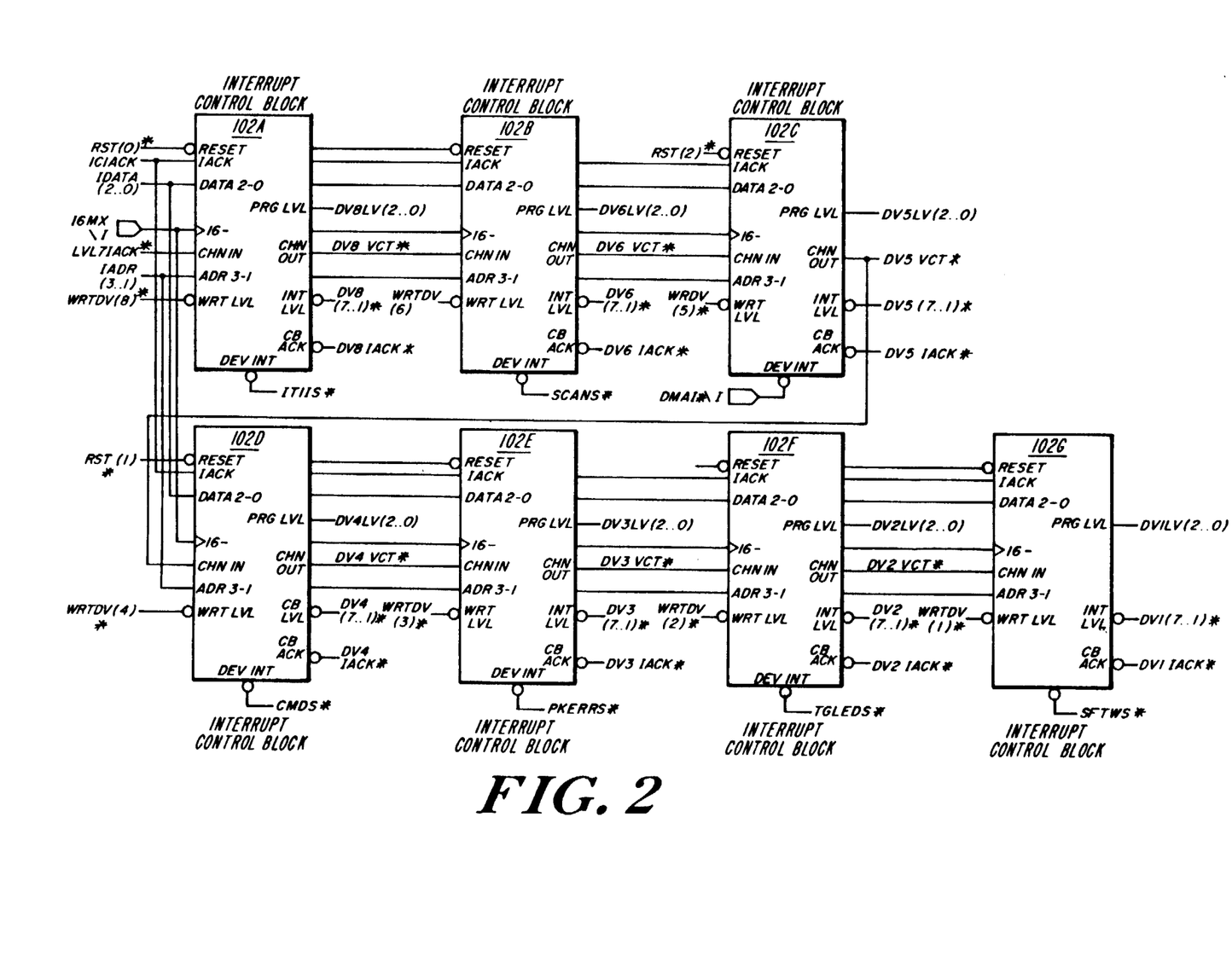
FIG. 2 is a schematic diagram showing a serial ring configuration of ICB elements in the interrupt priority encoder system of FIG. 1.

FIG. 2 depicts an arrangement of ICB elements 102 of the interrupt priority encoder 100 constructed in accordance with the invention. The ICB elements 102 are chained together in serial communication with each other in order of the fixed, second-level priority of the encoder. The chain configuration is used for passing interrupt acknowledge information, for example in the form of a query (IACK) signal 120 from the CPU 106, to identify the device 108 matching the interrupt generation.

Figure 3:
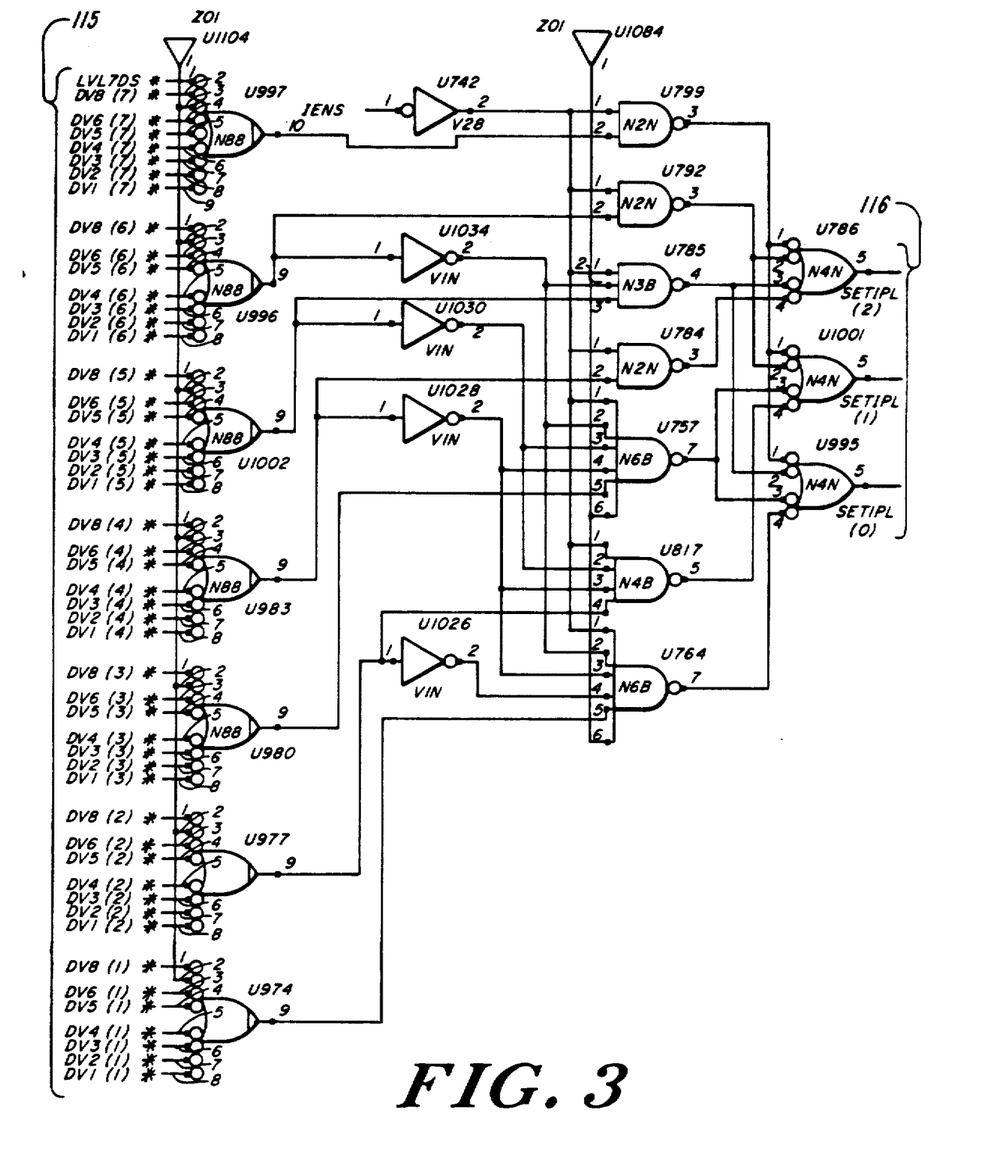
FIG. 3 is a schematic diagram showing the level interrupt encoding circuitry in the interrupt priority encoder system of FIG. 1.

FIG. 3 exemplifies a level interrupt encoder 104. When a device, e.g., 108C, generates an interrupt, the associated ICB 102C drives the level interrupt encoder 104 through the ICB 102C output DV5 <7 ... 0> of FIG. 2. All ICB outputs DVn<7 ... 0> are combined at the level interrupt encoder 104 through a set of leads 115 as diagrammed in FIG. 3. These leads 115 are programmably activated for each ICB with a priority designation such that a corresponding 3-bit number, i.e. the DVL signal, is encoded at the output 116 of the level interrupt encoder 104.

Figure 4:
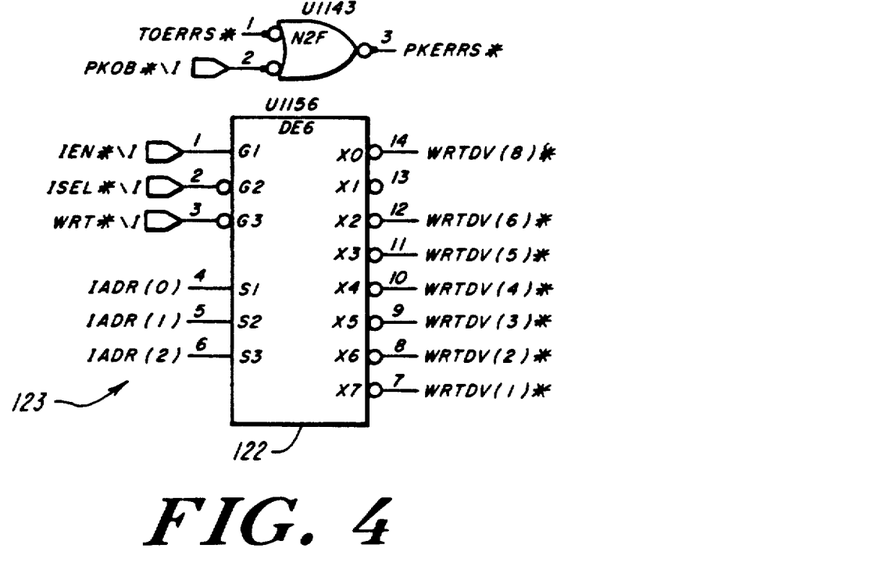
FIG. 4 is a schematic diagram showing programming circuitry in the interrupt priority encoder system of FIG. 1.

FIG. 4 shows circuitry 123 of an interrupt priority encoder 100 which selects a particular ICB so that the priority level of its associated device 108 may be programmed. The element 122 receives Programmed input from external to the ICB for programmably setting the priority level for that ICB. Element 122 then enables the writing of a new programmed level (PLV) to a designated ICB element through a device address IADR<0 ... 2>, multiplexed into WRTDV<n>. WRTDV<n>uniquely selects the ICB whereinafter the programmed data is sent to the ICB for storage through IDATA<2 ... 0>, as shown in FIG. 2.

Figure 5:
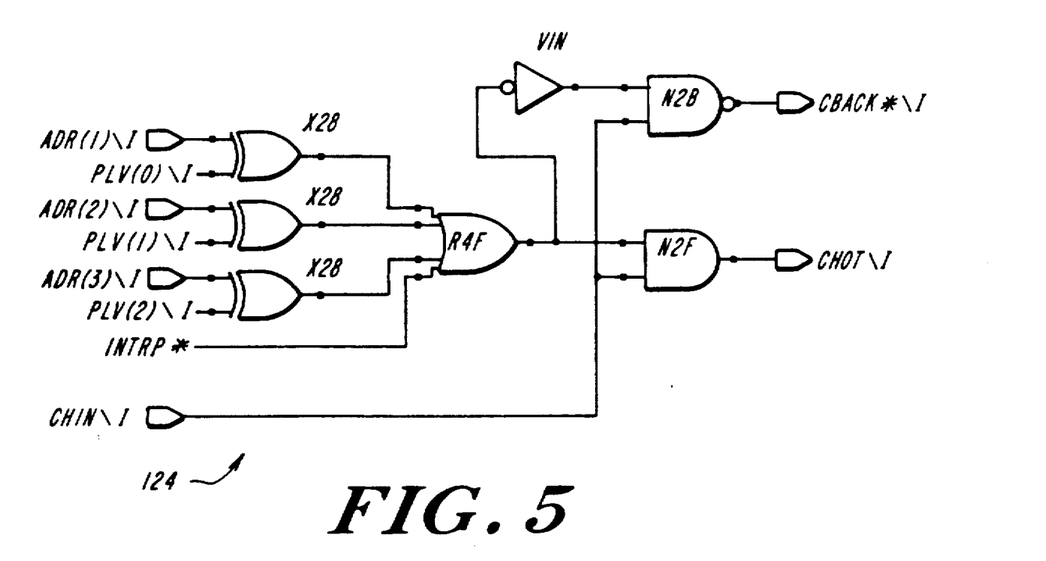
FIG. 5 is a schematic diagram of the comparator circuitry in the interrupt priority encoder system of FIG. 1 which compares the CPU generated query signal to the programmed level of the associated device.

FIG. 5 shows comparator circuitry of an interrupt priority encoder 100. This circuitry determines if a device 108 with an interrupt pending 101 is at a priority level commensurate with the next interrupt to be processed by the CPU 106.

After a device interrupt is prioritized and encoded with a 3-bit number, the signal is arbitrated and routed to the CPU 106. The CPU then enters an interrupt acknowledge cycle to interrogate the priority encoder 100 of the invention and to identify the device that signalled the interrupt. To do this, the CPU asserts a query signal 120 (IACK), along with the interrupt level that it chose among the accumulated interrupts. As shown in FIG. 2, the CPU-routed interrupt level is represented by IADR<3->.

The IACK 120 signal from the CPU 106 is first sent to the ICB 102A having the highest fixed second-level priority A subsequent ICB 102 can also receive these IACK signals 120 if the precedent serial ICB 102 generates a CH OUT signal. The receipt of a CH OUT is equivalent to a query IACK signal 120 from CPU 106. Each ICB 102 attempts to match its programmably assigned interrupt level to the level associated with the IACK, if the ICB has an interrupt pending.

The schematic of FIG. 5 thus compares the IACK level ADR<1>-ADR<3>, associated with the CPU-asserted IACK signal, to the programmably assigned level, PLV<0>-PLV<2>, associated with a particular ICB 102. If there is no match between the assigned ICB level and the level of the IACK query signal 120, or if the ICB 102 has no interrupt pending, the ICB 102 chains out (CH OUT) to the next sequential ICB 102. The process is repeated along the chain, i.e., the IACK signal 120 is passed from ICB 102 to ICB 102 in sequence until either a match is found, whereby the CBACK signal is generated, or the last ICB chains out causing the spurious interrupt vector to be returned to the processor. The spurious vector is a zero vector which the CPU ignores. In this way, if all ICB's had been assigned level 6 priority, and all had interrupts pending, then the return vector during a level 6 IACK would be from the first ICB on the fixed second level priority of the chain, e.g., 102A in FIG. 1.

More specifically, as shown in FIG. 2, when IACK is received by an ICB 102 at CH IN through the preceding ICB in the chain, it checks whether it had signalled a device interrupt (DV INT) to the CPU. If so, the ICB then compares the programmed interrupt level, i.e. the first-level programmable priority, PRG LVL, with the CPU-requested level, ADR $<n-n>$, according to the comparator shown in FIG. 5. If a given interrogated ICB 102 has the asserted level, the ICB 102 generates a signal CBACK, or control block acknowledge. If there is no match between the asserted level and the ICB programmed level, CH OUT is generated and sent to the next ICB in the chain.

It will be appreciated by those skilled in the art that once the CPU asserts the query signal IACK, the comparison in the ICB elements is done in parallel. That is, the comparator 124 for each ICB determines whether a match occurs at the same time. However, because the CH OUT signal propagates from ICB to ICB, only one such ICB has an opportunity to assert a match at any given time.

Figure 6A:
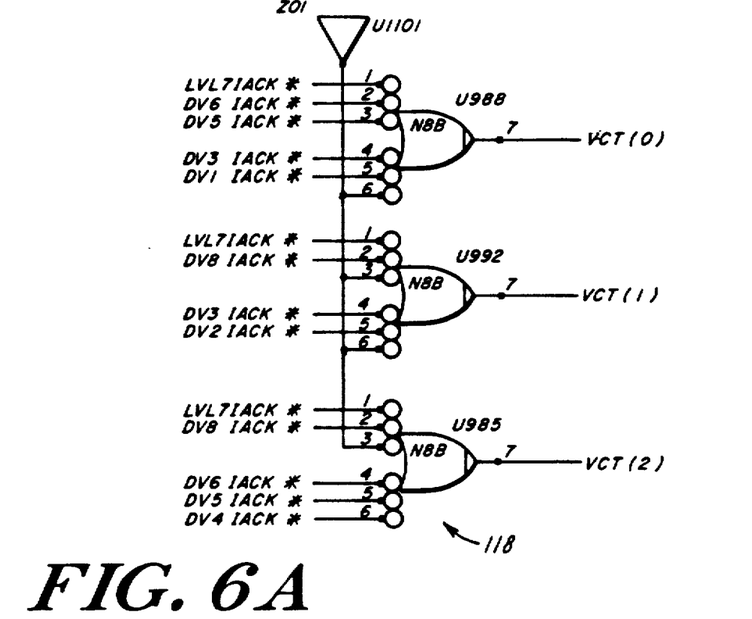
FIGS. 6A and 6B are schematic diagram of circuitry used by the interrupt priority encoder of FIG. 1 to generate a vector identifying the matched device.
Figure 6B:
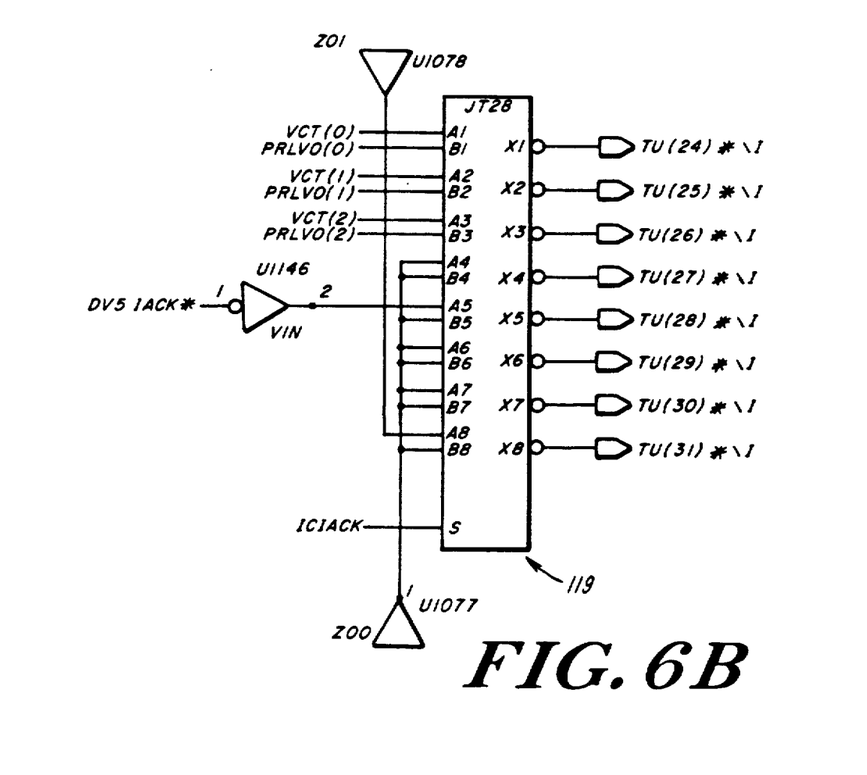

FIGS. 6A and 6B embody some of the operational schematics within the vector encoding circuitry 105. As noted above, once a match is found during an interrupt acknowledge cycle, the CBACK signal 103 is generated. CBACK, also referred to as DVnIACK in FIG. 2, is routed through a vector encoder 118. A vector VCT is generated and sent to the CPU 106 via the MUX 119. The MUX 119 uses VCT$<0\ldots2>$ for encoding the output vector VCT to the CPU when ICIACK is asserted from the CPU, as part of the IACK query. Otherwise, PLV$<0\ldots3>$ is used for the output vector. The CPU uses the output from the MUX 119 to access the address in memory of the appropriate trap-handling code.

Figure 7A:
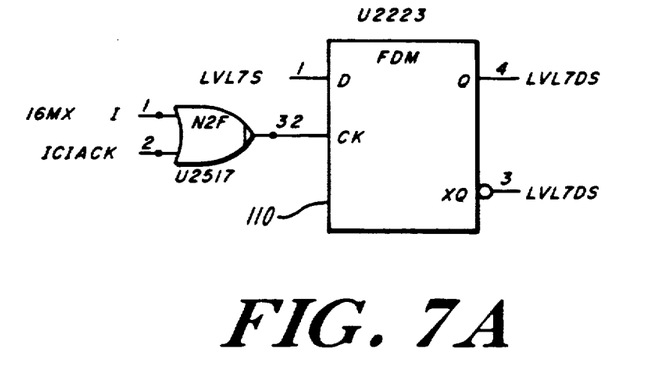
FIGS. 7A and 7B are an aspect of the invention showing a non-programmable ICB schematic.
Figure 7B:
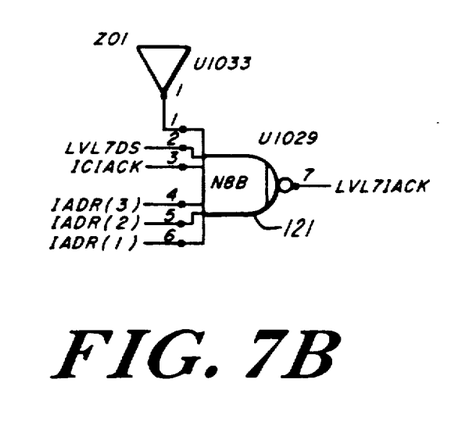

FIGS. 7A and 7B illustrate an embodiment of the interrupt priority encoder wherein the ICB chain begins with a non-programmable ICB 110. ICB 110 does not generate a DV INT, but takes a synchronized form or a level 7 interrupt, i.e. LVL7S, and double-synchronizes it to LVL7DS. The associated comparator 121, similar to the one presented in FIG. 5, couples with the non-programmable ICB 110. According to this embodiment, ICB 110 would be connected to a device requiring highest fixed priority (e.g level 7), such as a device flagging a potential system crash.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. For example, although only four ICB elements are illustratively shown in FIG. 1, it will be appreciated that the teachings herein are equally appreciable to an encoder 100 having a different number of ICB elements 102.

What is claimed is:

1. In a digital data processor of the type having a plurality of devices, each said device being capable of asserting an interrupt and producing a signal representative thereof, and a central processing unit (CPU) for processing said interrupts, each having associated therewith an interrupt value, to determine an interrupt value to be processed, and means for generating a query signal representative of that interrupt value to be processed, the improvement including an interrupt priority encoder comprising:

a plurality of coupled ICB elements, each connected to an associated one of said devices, at least one ICB element including i) programmable level storage means for programmably storing an operator-selectable interrupt value for the associated device;

ii) means responsive to assertion of said interrupt by the associated device for generating a signal (DVL) representative of said stored interrupt value of the associated device, iii) means responsive to a query signal generated by said central processing unit in response to at least one said DVL signal, said query signal being representative of an interrupt value to be processed, for generating a signal (DEV ACK) representative of a (a) match between said query signal and said stored interrupt value of said associated device, and (b) receipt of a said interrupt.

2. In a digital data processor according to claim 1, the further improvement in which said interrupt priority encoder includes vector means, coupled to said ICB elements and responsive to said match signal, for encoding a signal representative of a predetermined interrupt vector of said associated device.

3. In a digital data processor according to claim 1, the further improvement wherein at least one said ICB element is in serial communication with another said ICB element, a preceding said ICB element receiving said query signal prior to another of said ICB elements.

4. In a digital data processor according to claim 1, the further improvement wherein said coupled ICB elements are chained together in serial communication.

5. In a digital data processor according to claims 3 or 4, the further improvement wherein the first ICB element in said serial communication is non-programmable.

6. In a digital data processor according to claim 1, the further improvement wherein at least one said ICB element further comprises means for generating a non-match signal (CH OUT) representative of at least one of the following conditions:

(a) a lack of correspondence between said query signal and said stored interrupt value; or (b) non-receipt of a said interrupt from said associated device.

7. In a digital data processor according to claim 6, the further improvement wherein said match signal means of at least one said ICB element is responsive to said CH OUT signal generated by another said ICB element for generating said DEV ACK signal representative of a match between said query signal and said stored interrupt value of said associated device, and receipt of a said interrupt from said associated device.

8. In a digital data processor according to claim 5, the further improvement wherein said interrupt value stored in said level storage means of said first ICB element is greater than said interrupt value stored in said level storage means of other said ICB elements.

* * * * *